Figure 1:
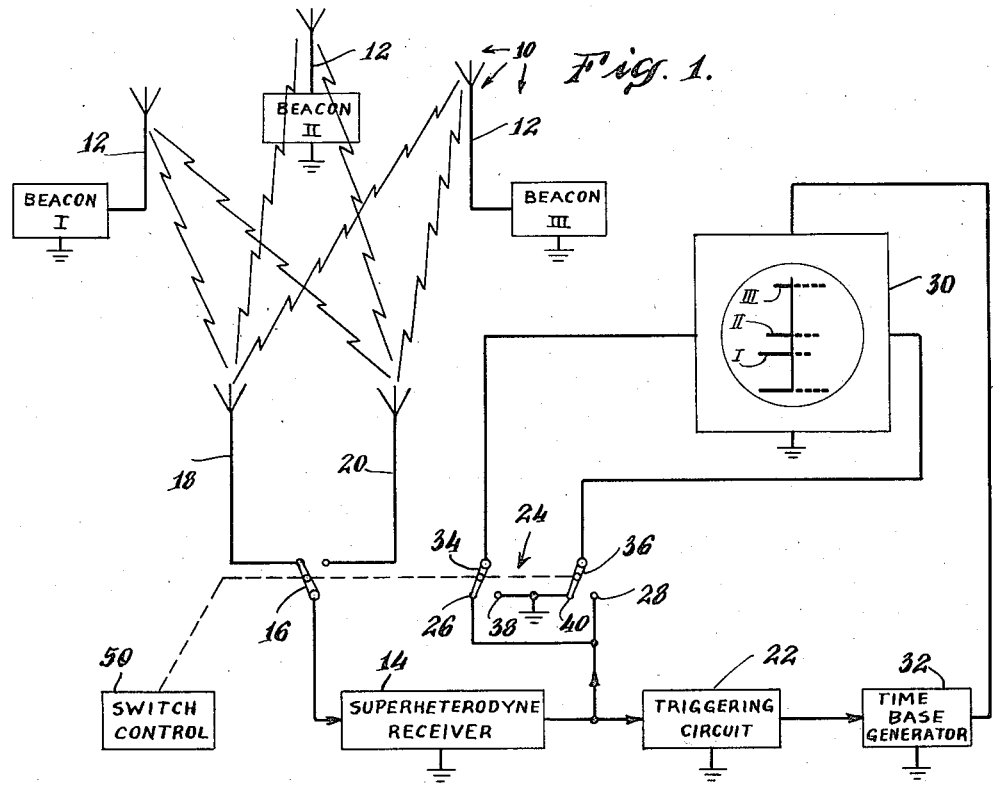

July 1, 1958      D. KERR      2,841,788

RADIO LOCATING SYSTEM AND APPARATUS THEREFOR

Filed Oct. 12, 1953

INVENTOR.
David Kerr
BY
Churchill, Rich, Weymouth & Engel
ATTORNEYS

United States Patent Office 2,841,788
Patented July 1, 1958

2,841,788

RADIO LOCATING SYSTEM AND APPARATUS THEREFOR

David Kerr, Ealing, London, England, assignor to Ultra Electric, Inc., Wilmington, Del., a corporation of Delaware Application October 12, 1953, Serial No. 385,623

Claims priority, application Great Britain October 14, 1952

10 Claims. (Cl. 343—101)

This invention relates to the art of radio location or homing. More specifically the invention is related to that form of radio location wherein one or more transmitters or beacons are provided to define a given point or geographic position which it is desired to locate and complementary receiving apparatus is provided which may be carried by a searching party or the like.

Radio locating aparatus of the above type can be particularly useful in locating persons lost at sea when the person is provided with the beacon, for example, as part of his life saving equipment. In such situations a search craft provided with the proper receiving equipment can intercept the transmitted signals and utilize them for the purpose of homing on the victim.

Attempts have been made in the past to provide radio locating apparatus of the above type. One such system employs a cathode ray tube at the receiver for providing a display which can be read by the operator in terms of direction to the beacon. In the operation of such equipment it is essential that the radio receiver be operated at maximum sensitivity. As is well known, such operation is accompanied by considerable "noise" due to atmospheric disturbances, tube noise, and the like. This "noise" shows up on the cathode ray tube as random traces which are commonly referred to as "grass." To provide a readable signal on the display tube which is not masked by the "grass," the known system employs a transmitter or beacon capable of sending out a pulse signal having a repetition rate of the order of 30,000 pulses per second. The time base at the receiver is operated at a constant frequency which is low relative to the pulse repetition rate of the beacon. Since there is no synchronization between the time base and the received signals, the display on the tube screen appears as an area of light.

A consideration of the above will show that the beacon, for the given mode of receiver operation, must operate at a high pulse rate. If the pulse rate were decreased so as to approach the frequency of the time base, the few pulses appearing on the tube screen due to the received signal would be indistinguishable from the "grass." This, however, is a considerable drawback when the equipment is intended for sea rescue or wherever available power is limited. Operation of the beacon at a high pulse rate requires an enormous quantity of electrical energy or power. This either results in limited life of the beacon or necessitates the provision of an extremely large battery or power pack.

An improved radio locating system wherein the above disadvantages are overcome is described and claimed in the copending application of Leonard George Walter Knott, Serial No. 353,870, filed May 8, 1953, and assigned to the same assignee as the present application. In said Knott application the receiver is arranged so that the time base is operated in synchronism with the beacon. This gives rise to repeated "writing" on the same portion of the tube screen providing a cumulative display which is readily distinguished from the "grass." Such operation is brought about by the provision at the receiver of a time base synchronizing circuit comprising a pulse space discriminator including a delay line. The transmitters or beacons of the Knott application are arranged to emit spaced groups of pulses, each group containing at least three pulses. Although the Knott system has an extremely good signal-to-noise ratio and therefore operates satisfactorily over long distances it is somewhat restricted in its application. Because of the pulse discriminator, only one beacon at a time can be observed on the screen of the display tube. At the same time energy dissipation at the beacon is not at a minimum since at least three pulses must be transmitted in each pulse group.

The present invention has as its general object to retain the advantageous features of the Knott system while avoiding the above noted drawbacks.

According to the present invention a novel radio locating system of the above type is provided wherein the transmitting means or beacon may transmit spaced groups of pulses, each group containing as few as two pulses. At the same time a receiver is provided which can, in cooperation with the transmitting means, simultaneously display indications corresponding to more than one such means.

In accordance with another aspect of the invention means are provided whereby the receiver operator can identify from the indications on the display device each transmitter which may be "heard."

The above operation is achieved while retaining the desirable feature of repeatedly "writing" the received signals on the same portion of the display screen whereby a high signal-to-noise ratio is still obtained.

Figure 2:
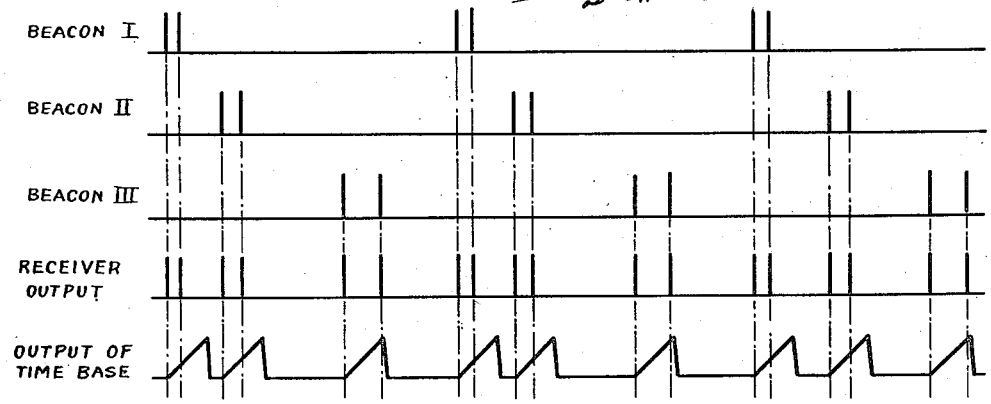

The invention will be better understood after reading the following description in connection with the accompanying drawings in which:

Figure 1 illustrates in block diagram form the basic components of the transmitters and receiver as well as the various interconnections; and Fig. 2 comprises a series of curves helpful in explaining the operation of Fig. 1.

Referring now to Fig. 1, there is indicated generally by the reference character 10 a plurality of self-controlled transmitting devices each for transmitting a radio pulse signal. By way of example, three such devices have been illustrated and labeled respectively, Beacon I, Beacon II and Beacon III. It will be assumed that a group of persons have been "lost" at sea and that each is carrying or wearing one of the beacons. Each beacon comprises a small transmitter which is battery operated and designed, when energized, to send out spaced groups of short pulses of radio fresquency energy. Typical pulse envelopes are shown in the first three lines of Fig. 2. In order to cause minimum power drain on the beacon, the groups of pulses may be arranged to consist of two pulses only; but it will be apparent after reading the following description that the groups may consist of three or more pulses without altering the operation of the receiver. As shown in Fig. 2, the spacing between the two pulses of a given group is different for each beacon. If more than two pulses are employed, pulse space coding may be used. It should also be noted that the time interval or spacing between the successive groups of pulses from a given beacon is long as compared with the duration of each group.

It is believed that the choice of suitable apparatus for emitting the illustrated wave train or modulation envelope will be well within the knowledge of those persons familiar with the art to which this invention appertains and, therefore, a detailed description is being omitted. Broadly what is required is a transmitter of radio frequency energy, means for pulse modulating said radio frequency energy to provide a modulation envelope consisting of spaced groups of pulses, and means for varying or predetermining the spacing between pulses of a group. An example of apparatus of this type is described and specifically claimed in copending application, Serial No. 357,698, filed in the United States on May 27, 1953 by myself jointly with Leonard George Walter Knott, and assigned to the same assignee as the present application. In addition to the required wave train the transmitter need only employ a radio frequency carrier whose frequency is sufficiently high to provide line-of-sight transmission. Preferably the carrier frequently is the same for all beacons. As shown, the beacons each include an antenna 12 which may take the form of a vertical rod, or the like.

The receiving means comprises a conventional superheterodyne type of receiver 14 arranged to have its input connected alternately by means of switch 16 to one or the other of antennas 18 and 20. The output of the receiver 14 is coupled over a first path to a time base synchronizing circuit or triggering circuit 22, and over a second path to terminals 26 and 28 of a switching device 24.

A display device is provided in the form of a cathode ray oscilloscope 30. As illustrated, the oscilloscope 30 is provided with means for deflecting its beam along both the X-axis and the Y-axis. Deflection along the Y-axis is controlled by the output from a triggered time base generator 32, which, in turn, is controlled by the output from the synchronizing circuit 22.

The generator 32 in cooperation with the triggering circuit 22 should be of the type which responds to an input triggering pulse to produce a single cycle of a deflection voltage wave and then remains dormant until the next triggering pulse is received. These circuits are well known and therefore are not described in detail. Such circuits also have the quality of remaining insensitive to further triggering pulses received during a wave producing cycle. For the present example it will be assumed that the output of the generator 32 is sawtooth in nature.

Deflection along the X-axis is controlled by the output from receiver 14 applied to the oscilloscope display device 30 through switching device 24. As shown, one terminal of the X-axis deflection means is connected to switch element 34 while the other terminal of the deflection means is connected to switch element 36. Switch element 34 is arranged to selectively engage terminal 26 or a second terminal 38. Similarly switch element 36 selectively engages terminal 28 or another terminal 40. Terminals 38 and 40 are connected together and to ground or any other point of reference potential.

The switch elements 34 and 36 are ganged together as well as being ganged with switch 16. With the switches in the position illustrated, antenna 18 is connected to the receiver 14 while the output of the receiver is connected to the left side of the oscilloscope, the right side being grounded. It should be understood that reference to the right and left side of the oscilloscope is purely for the purpose of simplifying the description and is intended to refer to the direction in which the beam is deflected along the X-axis. Therefore, when a pulse is received by antenna 18 it will show up on the screen of the oscilloscope as a trace or line originating at the Y-axis and extending toward the left parallel to the X-axis.

When the switches are operated to their alternative position, antenna 20 will be connected to the receiver and any signal it picks up will cause a deflection of the beam towards the right of the Y-axis. Thus, it can be seen that means are provided for visually comparing the strength of the signals intercepted by the respective antennas.

Refer now to switch control means 50 for operating the switches 16 and 24. The means 50 could take the form of a motor, assuming that the switches, illustrated diagrammatically, are of the mechanical type. However, the switching may obviously be performed electronically wherein means 50 might take the form of an oscillator, for example. In any case it should be understood that the switches are only diagrammatically illustrated.

The method employed for providing homing information will now be described briefly. The two antennas 18 and 20 are so constructed, employing well known techniques, that they are highly directive, having an axis of maximum sensitivity. The axis of maximum sensitivity of each, however, is inclined in the horizontal plane with respect to the axis of the other. Therefore if the remote beacon is on a line bisecting the angle formed by the axes of greatest sensitivity, then the strength of the signals provided by each antenna will be equal. If, however, the remote beacon is off to one side, the signal provided by one antenna will be much stronger than that provided by the other antenna. Knowledge of which antenna is providing the stronger signal will provide the relative direction of the beacon. As stated above, the relative lengths of the respective traces on the oscilloscope screen will provide such information.

The operation of the equipment will now be described with reference to Fig. 2. As stated above, the remote transmitting means or beacons 10 are arranged to emit spaced groups of pulses. These are shown in lines 1, 2 and 3 for the respective beacons I, II and III. The emitted pulses are intercepted by one or the other of the two antennas at the receiver and applied to the superheterodyne receiver 14. The output of receiver 14, shown in line 4, is applied to the triggering circuit 22. The output of triggering circuit 22 serves to initiate operation of the time base generator 32 which may provide an output as indicated in line 5. This causes the cathode ray beam to be deflected, in the present example, from its lowermost position on the screen toward its uppermost position. For reasons of simplicity, Fig. 2 ignores phase displacement between the transmitted and received pulses due to transit time. Such displacement in no way alters the operation of the system.

From the outset, the received pulses are applied to the X-axis deflecting means. The first pulse of each group, regardless of the beacon originating it, will appear at the same point at the bottom of the screen because deflection along the Y-axis has not yet commenced. See the bottom horizontal trace on the oscilloscope screen of Fig. 1. However, the second and any subsequent pulses of each group appear at higher points on the screen. In the present example, the groups have been limited to two pulses each. The oscilloscope screen in Fig. 1, therefore, shows the traces corresponding to the second pulses from each of the three beacons. These traces are appropriately designated I, II and III.

It should be evident from an examination of Fig. 1 that the operator of the receiver can determine from the screen of the oscilloscope the time interval between the bottom trace and, let's say, the trace marked I. Thus, if the operator knows that a certain individual has beacon I which is adjusted to send out pulse groups with the above noted time interval, then the operator is informed both as to the identity of the beacon and that of its possessor.

Considering line 5 of Fig. 2 it will be seen that the duration of a complete cycle of the time base generator 32 is only slightly longer than the duration of that pulse group having the maximum duration. In Fig. 2 it is the pulse group from beacon III which has the maximum duration. Normally the transmitters will be susceptible of adjustment within a limited range and the receivers will be adjusted to correspond to the maximum of said range. As a result the time base generator is ready to be triggered by a group received from a second beacon almost immediately after completion of a group from a first beacon. Because there is a relatively long interval between successive groups from a beacon the receiver has sufficient opportunity to respond to several other beacons. Thus the various beacons are sequentially displayed upon the screen of the oscilloscope. If the screen has sufficient lag or storage capability, or if the pulse group repetition rate is sufficiently high, all of the beacons will be visually observable simultaneously.

Because the beginning of the trace along the Y-axis is accurately synchronized with the reception of the first pulse, all subsequent pulses will occur at the exact same point on the oscilloscope screen. The resulting trace, due to repetitive writing, will be sufficiently brilliant to be readily distinguished from the background noise or "grass."

Thus the present invention provides a radio locating system wherein the transmitters are arranged to operate at a low pulse repetition rate, thus conserving power, and the receiver is arranged to simultaneously observe and identify all of the transmitters within radio range.

What I claim is:

1. A radio locating system of the homing type including in combination, self-controlled transmitting means for operation at a position to be located, said transmitting means being constructed to radiate spaced groups of pulses of radio frequency energy, the duration of each group being short relative to the time interval between successive groups, and receiving apparatus for homing on said transmitting means, said receiving apparatus comprising a cathode ray tube display device, time base generating means coupled to said tube and arranged to initiate a trace on the tube screen in response to and upon the reception of a radiated pulse from said transmitting means, said trace having a duration which is only slightly longer than the duration of a group of pulses, and means including a directional antenna system coupled to said tube for providing an indication thereon containing information as to the direction of said transmitting means, whereby a low power transmitting means can be homed upon in the presence of background noise.

2. In a radio locating system of the homing type employing means for radiating a radio frequency signal comprising a group of pulses from the point to be located and means for detecting said radiated signal to furnish directional information, in combination, a cathode ray tube indicating device, means including a directional antenna system coupled to said tube for providing an indication thereon containing information as to the direction of said radiating means, a time base generator coupled to said device, and triggering means for coupling the detected signals to said time base generator for causing a cycle of operation of said generator in response to and upon the detection of a radiated pulse, the duration of said cycle being only slightly longer than the duration of a group of said pulses, whereby successive groups of said pulses may be observed in superposition on said indicating device over and above the background noise.

3. A radio locating system of the homing type comprising in combination, a plurality of independent self-controlled transmitting means for unsynchronized operation at different locations, said transmitting means each being constructed to radiate spaced groups of pulses of radio frequency energy all on the same carrier frequency but at random phase with respect to any other transmitting means, the duration of a group being short relative to the time interval between successive groups from a given transmitting means, the spacing between successive pulses of a group being different for each of said transmitting means, and receiving apparatus comprising a cathode ray tube device, means including a directional antenna system coupled to said tube for providing an indication thereon containing information as to the direction of said transmitting means, a triggered time base generating circuit coupled to said tube, receiving means responsive to said carrier frequency coupled to said tube and to said generating circuit for supplying received pulses thereto, said generating circuit being constructed and arranged to initiate a time base cycle of fixed duration upon receipt of the first pulse of any group, said fixed duration being only slightly longer than the maximum duration of a pulse group from any transmitting means, whereby pulses from more than one transmitting means may be simultaneously displayed by the tube device and observed above the background noise, the position of a pulse indication along the time base being indicative of the identity of the transmitting means.

4. A radio locating system according to claim 3, wherein said time base generating circuit is coupled to said tube device for deflecting the tube beam along a first sweep axis, and said receiving means is coupled to said tube to cause deflection of said beam at right angles to said axis upon receipt of a transmitted pulse.

5. For use in a radio locating system of the homing type, receiving apparatus for simultaneously observing and identifying a plurality of independent remote transmitters each arranged to radiate spaced groups of characteristically spaced pulses of radio frequency energy, said receiving apparatus comprising a cathode ray tube, a triggered time base generator coupled to said tube for causing when triggered a trace of fixed duration to be generated upon a screen of said tube, the duration of said trace being slightly longer than the maximum duration of a group of pulses, said triggered generator being non-responsive to triggering signals when generating a trace, receiving means coupled to said generator for applying received pulses thereto in the form of triggering signals whereby said generator will be triggered and a trace will be initiated upon receipt of the first pulse of a group, means coupling the output of said receiving means directly to said tube for a control of the beam thereof, and means including a directional antenna system for causing the control of said beam to be such as to provide information as to the direction of said transmitter, whereby received pulses will be displayed upon said screen discernible from the background noise, the spacing of respective pulse indications along said trace being indicative of the identity of the source of said pulses.

6. In a radio locating system of the homing type, in combination, receiving apparatus for homing on a plurality of independent beacon devices each transmitting spaced groups of pulses of radio frequency energy wherein the spacing between pulses in a group differ from beacon to beacon, said receiving apparatus comprising a cathode ray tube display device, means for generating a time base signal coupled to said cathode ray tube for causing a straight-line time base trace to be generated on a screen of said tube, receiving means coupled to said tube for deflecting the electron beam of said tube at right angles to said time base trace in response to pulses received from one or more of said beacons, means including a directional antenna system for causing said deflection to be indicative of the direction of the said beacons, and triggering means coupled to an output of said receiving means and to said means for generating a time base, said triggering means being normally initiating the generation of a time base trace upon receipt of the first pulse of any group from any beacon, whereby all of the indications corresponding to said first pulses will be superimposed at the beginning of said time base trace, the indications corresponding to subsequent pulses of the groups appearing at varying distances along said trace from said superimposed indications, said varying distances serving to identify the beacon source.

7. In a radio locating system of the homing type receiving apparatus according to claim 6, wherein said directional antenna system comprises a pair of directive antennas having their axes of greatest sensitivity intersecting in the horizontal plane, and means for alternately connecting said antennas to an input of said receiving means in synchronism with reversal of the direction of deflection of said electron beam relative to said time base trace, whereby the relative extent of the pulse indications corresponding to a given beacon lying on either side of said time base trace will provide information as to the direction of said given beacon from said receiving apparatus.

8. A radio locating system of the homing type comprising, in combination, a plurality of separate self-controlled transmitting means arranged for independent operation, said transmitting means being constructed to radiate pulses of radio frequency energy all on the same carrier frequency, and receiving apparatus for observing simultaneously more than one of said plurality of transmitting means, said apparatus comprising a cathode ray tube display device having a viewing screen, triggered beam deflection means coupled to said tube for developing a trace on said screen, synchronizing means coupled to said deflection means for triggering said deflection means to initiate successive traces, the start of each trace being synchronized with and by a different self-controlled transmitting means, and means responsive to said carrier frequency for applying received pulses to both said synchronizing means and said display device, said last-mentioned means including a directional antenna system for causing a display on said tube indicative of the direction to said transmitting means, whereby indications of pulses from more than one transmitting means operating on the same carrier frequency may be observed simultaneously in spite of prevailing background noise.

9. A radio locating system according to claim 8, wherein said deflection means is arranged to provide a straight-line trace and the pulses applied to said display device are arranged to cause deflection of the beam of said tube at right angles to said trace line.

10. In a radio locating system of the homing type employing a receiving device responsive to a given radio carrier frequency for detecting radio signals having said carrier frequency and including a directional antenna system for providing an indication of the direction of the source of said signals, in combination therewith, a plurality of self-controlled beacon transmitters all tuned to said given carrier frequency and operable independently remote from said receiving device to radiate radio frequency energy having said carrier frequency, said beacon transmitters each comprising means for radiating said energy in the form of spaced groups of pulses, the duration of a group being short relative to the time interval between successive groups from a given beacon transmitter, whereby a substantial portion of the pulse energy from any one beacon transmitter is radiated during the interval between pulse groups from the other beacon transmitters thereby developing minimum interference between said plurality of beacon transmitters notwithstanding their operation on the same carrier frequency.

References Cited in the file of this patent

UNITED STATES PATENTS

| | | |
|---|---|---|
| 2,234,334 | Dziewior | Mar. 11, 1941 |
| 2,279,246 | Podliasky et al. | Apr. 7, 1942 |
| 2,403,429 | Anderson | July 9, 1946 |
| 2,403,626 | Wolff et al. | July 9, 1946 |
| 2,419,525 | Alford | Apr. 29, 1947 |
| 2,444,445 | Isbister | July 6, 1948 |
| 2,492,354 | Busignies | Dec. 27, 1949 |
| 2,554,893 | Brunn | May 29, 1951 |

UNITED STATES PATENT OFFICE

CERTIFICATE OF CORRECTION

Patent No. 2,841,788

July 1, 1958

David Kerr

It is hereby certified that error appears in the printed specification of the above numbered patent requiring correction and that the said Letters Patent should read as corrected below.

Column 2, line 51, for "fresquency" read -- frequency --; column 3, lines 12 and 13, for "frequently" read -- frequency --.

Signed and sealed this 2nd day of June 1959.

(SEAL)
Attest:

KARL H. AXLINE
Attesting Officer

ROBERT C. WATSON
Commissioner of Patents